Figure 1:
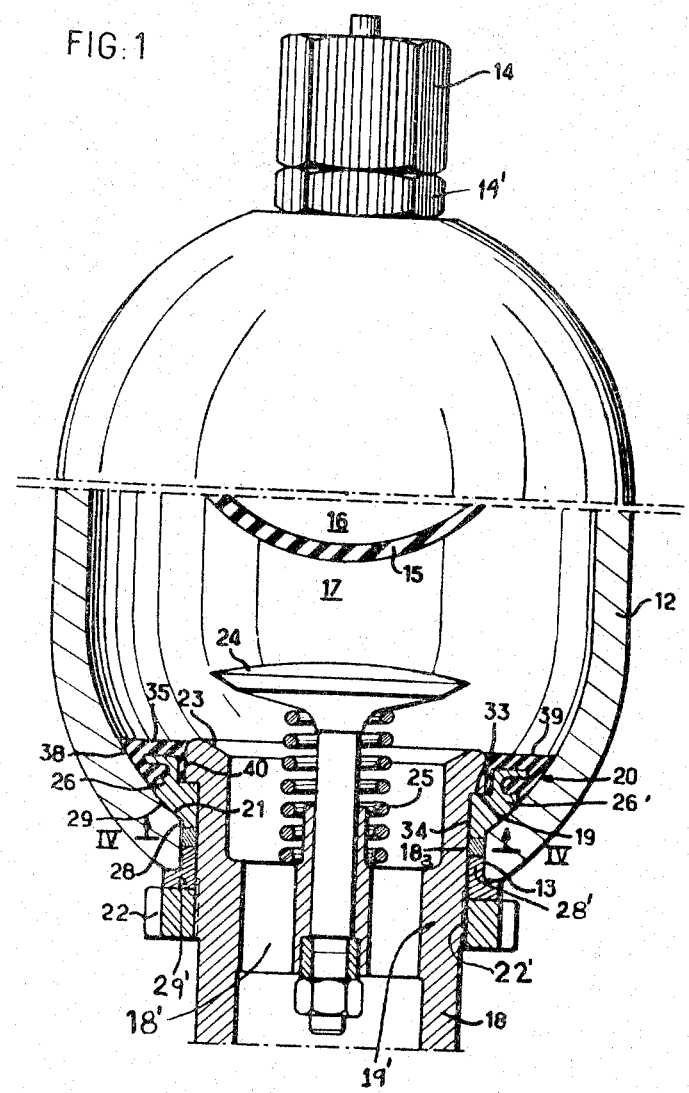

May 2, 1967   J. H. MERCIER   3,316,939
LOCKING RING

Original Filed Jan. 31, 1963

3 Sheets-Sheet 1

INVENTOR
JACQUES H. MERCIER
By Dean, Fairbank & Hirsch
ATTORNEYS

May 2, 1967    J. H. MERCIER    3,316,939
LOCKING RING
Original Filed Jan. 31, 1963    3 Sheets-Sheet 2
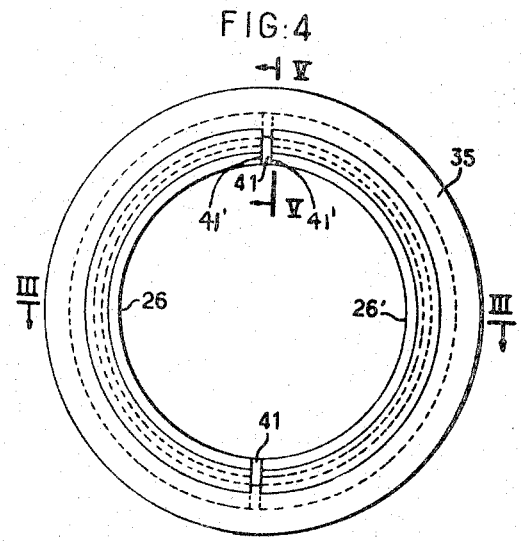
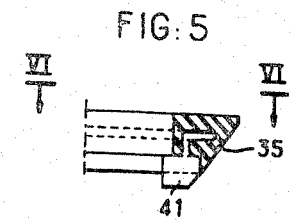
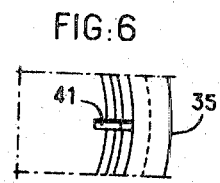
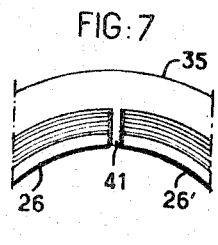
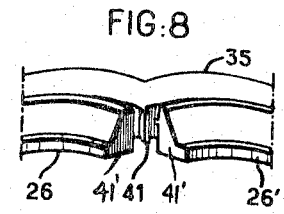
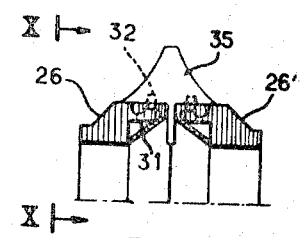
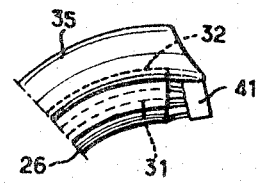
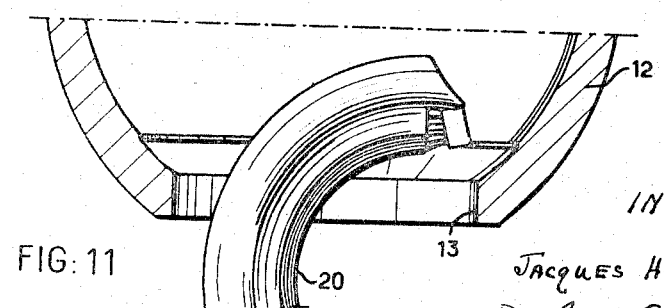
INVENTOR
JACQUES H. MERCIER
By *Dean, Fairbank & Hirsch*
ATTORNEYS May 2, 1967 J. H. MERCIER 3,316,939
LOCKING RING Original Filed Jan. 31, 1963 3 Sheets-Sheet 3

INVENTOR
Jacques H. Mercier
By Dean, Fairbank & Hirsch
ATTORNEYS

United States Patent Office 3,316,939
Patented May 2, 1967

3,316,939
LOCKING RING
Jacques H. Mercier, New York, N.Y., assignor to Mercier Olaer Patent Corporation, Wilmington, Del., a corporation of Delaware
Original application Jan. 31, 1963, Ser. No. 255,388, now Patent No. 3,148,705, dated Sept. 15, 1964. Divided and this application Sept. 1, 1964, Ser. No. 393,564
15 Claims. (Cl. 138—30)

This application is a division of copending application Ser. No. 255,388, filed Jan. 31, 1963, and now Patent No. 3,148,705.

This invention relates to a locking ring for retaining two rigid parts together and more particularly to a locking ring for the closure plug of a pressure vessel for storing fluid under pressure and particularly of the type having a deformable partition, such as a bladder, therein.

As conducive to an understanding of the invention, it is noted that where a pressure container has an opening or port with a removable closure plug therein, the use of a threaded plug is undesirable in that the threads may become worn and stripped with likelihood of blowing out of the plug when high pressures are attained in the container. In addition, if such plug can be removed before substantially all of the pressure is relieved in the container, when the mechanic disassembling the container has partially released the plug, it may suddenly blow out and cause severe injury.

To overcome such difficulties, a plug may be utilized having a reduced neck defining a shoulder and forming an enlarged inner end portion of smaller outside diameter than the port so that it may be inserted therein. A locking member in the form of a ring encompassing the reduced neck portion of the plug, has an outer diameter greater than that of said port and an inner periphery overlapped by the shoulder of the enlarged end portion of the plug and is seated in position with rigid portions of the locking member intervening between the inner rim of the port and said shoulder. By means of any suitable retaining element, such as a nut screwed on the externally threaded neck of the plug, which protrudes from the port, the plug may be releasably, yet securely affixed to said container. As the locking member is of greater diameter than the port, in order that it may be inserted therethrough into the container, it is made deformable as by having portions thereof relatively displaceable.

Where, to permit such deformation, the locking member is of resilient metal having one or more splits through the circumference thereof, such as a conventional split ring which may be of hardened spring steel, the pressure vessel bladder as it expands to expel liquid from the container, will come in contact with the portion of the surface of such ring which extends laterally outward from the shoulder of the plug and especially at high pressures, extrude through such split, thereby pinching or cutting the bladder with resultant destruction of the latter and failure of the pressure vessel.

In order to permit such deformation and provide a surface against which the pressure vessel bladder may abut which has no splits or discontinuities, as shown in Patent No. 2,936,787, a locking member has been provided which comprises a plurality of arcuate segments arranged substantially in a ring, the adjacent ends of said segments being spaced from each other. The segments are desirably of hardened metal such as steel which will withstand the shearing action against the inner periphery of the locking member caused by the pressure on the enlarged end of the plug when the bladder is bearing thereon and the shearing action caused by the pressure of the locking member against the rim of the port. The segments are connected together by a resilient ring which is gued, cemented or otherwise bonded to the top of the locking member so as to be securely retained with respect thereto and so positioned that the top of the locking member will present an uninterrupted surface to the bladder, the resilient ring permitting relative displacement of portions of the locking member so that it may be deformed for insertion into the port, the locking member being self-restoring to its original shape.

By reason of the fact that the resilient ring is bonded as by gluing to the top surface of the rigid arcuate segments, such bonding operation requires that the contacting surfaces be previously prepared, which adds to the cost of manufacture. Furthermore, since the resilient ring is bonded to the rigid arcuate segments, little displacement is possible of the portions of the resilient ring adjacent the regions where the locking member is folded and unfolded. This results in substantial fatigue of the material of the resilient ring at such regions with repeated folding actions which causes breakdown of the unit with resultant failure thereof.

It is accordingly among the objects of the invention to provide an annular locking member which may readily be fabricated at relatively low cost and which may readily be deformed for insertion into an opening of diameter less than the unfolded diameter of the locking member, which locking member will provide an uninterrupted resilient surface and which may be folded and unfolded with relatively free movement between the resilient ring and the rigid segments of the locking member at the region of folding and unfolding, thereby reducing fatigue at such regions.

According to the invention, these objects are accomplished by the arrangement and combination of elements hereinafter described, and more particularly recited in the claims.

Figure 2:
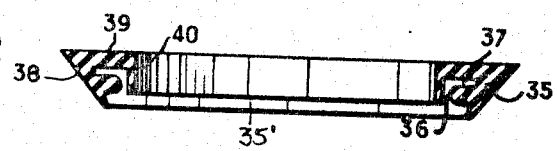
Figure 3:
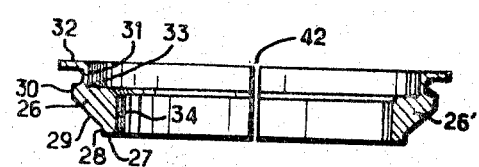
Figure 12:
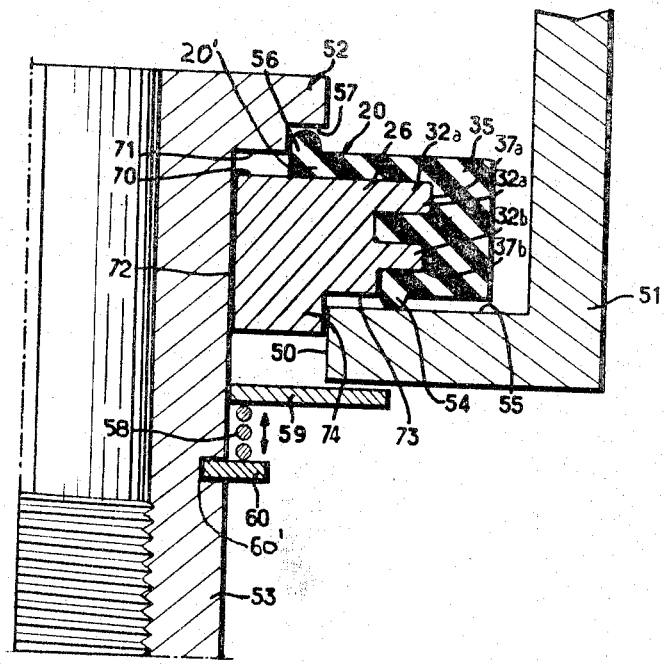
Figure 13:
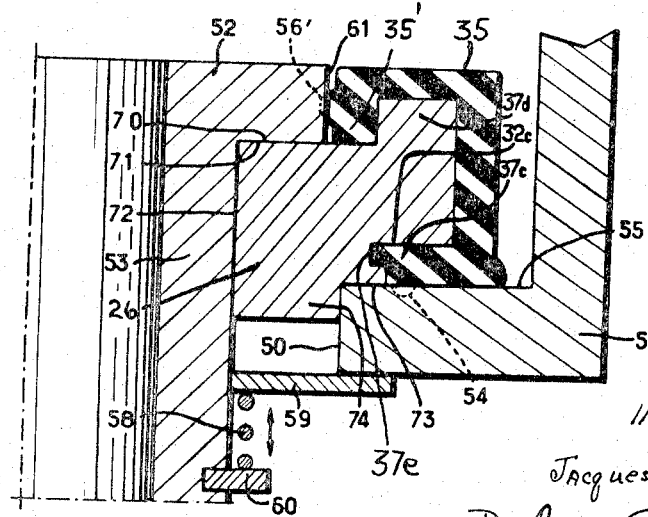

In the accompanying drawings in which are shown one or more of various possible embodiments of the several features of the invention, FIG. 1 is a longitudinal sectional view of a pressure vessel embodying the invention herein, FIG. 2 is a diametric sectional view of the resilient ring forming part of the locking member, FIG. 3 is a sectional view of the rigid arcuate segments alone, taken along line III—III of FIG. 4, FIG. 4 is a view of the locking member taken along line IV—IV of FIG. 1, FIG. 5 is a fragmentary detail view of the resilient ring alone in section taken along line V—V of FIG. 4, FIG. 6 is a corresponding plan view taken along line VI—VI of FIG. 5, FIG. 7 is a partial view of the locking member similar to FIG. 4 before folding, FIG. 8 is a view similar to FIG. 7, but in which the two metal arcuate segments are starting to be moved apart from each other, FIG. 9 is a view similar to FIG. 7, but in which the two rigid arcuate segments are completely moved apart, FIG. 10 is a corresponding side view taken along line X—X of FIG. 9, FIG. 11 is a view illustrating the introduction of the locking member folded on itself, into the port of the pressure vessel, and FIGS. 12 and 13 are sectional views of two other embodiments of the invention.

Referring now to the drawings, the locking member according to the invention, is illustratively shown in FIGS. 1 to 11, incorporated in a pressure vessel such as a pressure accumulator. This accumulator desirably comprises a rigid container 12 of material such as steel which is capable of withstanding high pressure. The container as opposed ports, the upper port being designed to receive a standard pneumatic valve 14 and the lower port designated by the numeral 13 serving as the liquid port. Positioned in the container in conventional manner is a deformable partition, illustratively a bladder 15, the latter desirably being of rubber, either natural or synthetic and capable of expanding in order to force liquid from the container and defining a gas chamber 16 and a liquid chamber 17 on opposed sides thereof.

The port 13 desirably has a cylindrical outlet plug 18 positioned therein, the latter having a longitudinal bore therethrough and having a flange at its inner end defining an annular shoulder 19 and reduced neck portion 19'. The outer diameter of the flange is slightly less than the diameter of the port 13 so that it may readily be inserted therethrough and the neck 19' is of length such that it may protrude from port 13.

The plug 18 has a transverse wall with passageways therethrough and also has an axial bore through which extends the stem of a spring urged poppet valve 24, the periphery of the latter being designed to seat on the bevelled inner surface 23 of the bore of the plug.

The outlet plug 18 is affixed to the container 12 by a locking member 20 in the form of a ring constructed so that it may readily be deformed for insertion through port 13 into the container 12. As shown in FIGS. 2 and 3, for example, the locking member 20 comprises a resilient ring 35 and a plurality of arcuate segments, illustratively two in number and designated by the numerals 26 and 26', preferably of hardened metal such as steel. Each of the segments is slightly less than 180 degrees of arc so that when juxtaposed to form a ring, the adjacent ends 41' thereof may be spaced from each other as is clearly shown in FIG. 4, for example. The ring formed by said juxtaposed segments has an inner diameter shown at 34 in FIG. 1, but slightly larger than the outer diameter of neck 19' of plug 18 so that the inner wall 34 of said segments 26, 26' may snugly encompass neck 19' with shoulder 19 of the plug 18 resting on the inner periphery 33 of said segments. The outer diameter of the ring formed by said juxtaposed segments 26, 26' is greater than that of the port 13 so that the oblique or bevelled portion 29 of the segments 26, 26' which conform generally to the shape of the inner surface of the container 11 adjacent port 13 may seat thereon.

The undersurface of each of the segments adjacent the inner periphery thereof each has a cylindrical lower section defining an arcuate hub 28 of width substantially equal to the difference between the outer diameter of neck 19' and the diameter of port 13 so that said hub, when positioned between neck 19' and port 13, will center the plug 18 in said port 13.

More particularly, referring to FIG. 3, each of the segments 26, 26' comprises a flat lower face 27, an outer side face having the cylindrical lower section 28 which defines the hub, an intermediate section which defines the oblique or bevelled portion 29 and a cylindrical upper section 30 of larger diameter than section 28. In addition, each of the segments has an upper rim in the form of an inverted L with an upright portion 31 and a horizontal portion 32 directed outwardly, said rims 31, 32 being at the outer periphery of each of the segments, the top wall of each segment defining the annular shoulder 33 from the inner periphery of which the inner wall 34 of each segment depends.

The segments 26, 26' are designed to be mounted in the resilient ring 35 so that they may be securely but releasably retained therein.

To this end, the lower surface of the ring 35 has a circular recess 35' therein of depth but slightly less than the height of the cylindrical portion 30 of the segments. In addition, an inverted substantially L-shaped annular groove is provided in said elastic ring 35 complementary to the rim portions 31, 32 of the segments. Thus, the groove has a portion 37 designed to accommodate the rim portion 32 and a portion 36 designed to accommodate the rim portion 31.

When the arcuate segments 26, 26' are mounted in the resilient ring 35, the resulting locking member will have the shape shown in FIG. 1, the resilient ring 35 having an oblique or bevelled outer periphery 38 which is designed to form an extension of the bevelled surface 29 of the segments.

It is to be noted that in the embodiment shown, the resilient ring 35 has two diametric fins 41, clearly shown in FIGS. 4 to 8, for example, which are formed integral with the resilient ring and extend inwardly therefrom, said fins being designed to be positioned in the space between the adjacent ends 41' of the segments as is clearly shown in FIG. 4.

If desired, the depending protion 40 of the resilient ring, which is interposed between the rim portion 31 and the adjacent inner end of the plug 18 could be eliminated and the rim portion 31 made of slightly greater thickness so that it would be positioned closely adjacent the flange portion of the plug 18.

It is to be noted, referring particularly to FIG. 1, that the width of the top surface 39 of the elastic ring is such that when the locking member is positioned in the container 12, such surface 39 will fill the space between the inner surface of the container adjacent the port 13 and the adjacent portion of the inner end of the plug 18, thereby providing a substantially continuous surface which the expanding bladder 15 may contact during operation of the equipment.

In order to provide a liquid-tight seal between the neck 19' of plug 18 and the wall surface of port 13, a resilient sealing ring 18a, preferably an O-ring, encompasses the neck 19' between hub 28 and the reduced diameter portion 28' of a collar 29' which encompasses the neck 34. A nut 22 screwed on the externally threaded portion 22' of neck 34, when tightened, will securely retain the parts in assembled relationship.

In assembling the accumulator, the bladder 15 is passed through the port 13 of the empty container 12. The valve stem (not shown) secured to the bladder is pushed through an opening in the upper end of the container 12 and secured thereto as by means of nut 14'. The plug 18 is then passed through the port 13 and the locking member 20 is deformed by being folded in two as shown in FIGS. 7, 8, 9 and 11, for example, such folding being permitted by reason of the fact that the rigid arcuate segments 26, 26' are spaced from each other by the resilient material of the ring 35.

The deformed locking member 20 may readily be passed through the port 13 into the container 12 as shown in FIG. 11.

The locking member 20 is then released and by reason of the resilience of the folded resilient ring 35, will assume its original ring-like shape so that it may readily be passed around the neck portion 19' of the plug 18. The plug 18 can then be drawn outwardly until its shoulder 19 seats against the inner peripheries 33 of the locking segments 26, 26' and the bevelled surface 29 of the segments seat on the inner surface of container 12 about port 13. The sealing ring 18a and collar 29' may then be placed around the neck 34 and moved therealong until the ring 18a is against the hub 28. The nut 22 is then screwed on neck 19' and tightened securely to retain the shoulder 19 of the plug against the inner periphery 33 of the segments and the undersurface of the segments against the inner surface of the container 11 about port 13, the O-ring 18a providing a dependable seal between the neck 19' and the wall of the port 13. The pressure accumulator later may then be used in conventional manner.

The construction of the locking member has been described with reference to its incorporation into a pressure reservoir such as a pressure accumulator as shown in FIGS. 1 to 11.

It is to be understood, however, that the locking member, according to the invention, has broader application and may be used whenever it is desired to connect one cylindrical member to another cylindrical member with one of the members having an opening therein through which the other member extends.

In the embodiment shown in FIG. 12 a locking member, according to the invention, is utilized to connect two members 53, 51, the part 53 being a cylindrical member such as a pipe, for example, having an annular flange 52 at its inner end which has an annular notch in its undersurface defining an annular shoulder 57, and an annular seating surface 71 inwardly of the shoulder 57. The member 51 has a circular opening 50 therein through which the pipe 53 extends, the diameter of opening 50 being greater than the diameter of the flange 52. As is clearly shown in FIG. 12, the portion of the member 51 encompassing the opening 50, defines an annular shoulder 55.

The locking member 20, shown in FIG. 12, comprises a resilient ring 35 having an inwardly extending annular flange 20' at its top surface with an upstanding bead 56 at its inner periphery. The inner surface of the resilient ring 35 has two annular grooves 37a and 37b and an annular bead 54 depends from the undersurface of the inner periphery of the resilient ring 35.

A plurality of arcuate segments 26, illustratively two in number, are provided, which, when juxtaposed, form a ring having an inner diameter 72 just slightly greater than the outer diameter of the pipe 53 as is clearly shown in FIG. 12. Each of the segments 26 has a flat top wall 70 and an arcuate recess in its undersurface defining a cylindrical hub 74 adapted to fit into the opening 50 with but little clearance, said hub defining an arcuate shoulder 73 outwardly thereof. Two spaced parallel arcuate flanges 32a and 32b extend laterally outward from the segments 26 and are designed to be positioned in the recesses 37a and 37b as is clearly shown in FIG. 12.

In assembling the unit shown in FIG. 12, the pipe 53 is inserted through the opening 50 and then the locking member 20 is folded and inserted through such opening and positioned around the pipe 53 below the flange 52. Thereupon, a washer 59 is positioned around the portion of pipe 53 extending outwardly from opening 50; a coil spring is then interposed around the pipe and a snap ring 60 is positioned in an arcuate groove 60' in pipe 53, said snap ring 60 serving as a retainer for the coil spring which will be compressed between the washer 59 and the snap ring 60, thereby tending to urge the pipe 53 outwardly.

As a result, the hub 74 will be moved into the opening 50 until shoulder 73 abuts against shoulder 55 compressing bead 54. The surface 71 will move downwardly until it abuts against the top surface 70 of the segments inwardly of the outer periphery of the flange 20', thereby providing a dependable seal, the shoulder 57 comprising the bead 56.

The embodiment shown in FIG. 13 is similar to that shown in FIG. 12 with certain minor variations.

In the embodiment of FIG. 13 the resilient locking ring 35 is substantially U-shaped and has a depending annular rim 35' at its inner periphery, which rim has an outwardly extending annular bead 56' on its outer surface, which is designed to abut against the outer periphery 61 of the flange 62 of the pipe 53 as is clearly shown in FIG. 13. Each of the rigid arcuate locking segments 26 has a flat shoulder 70 at its inner periphery against which the bottom surface 71 of the flange 52 may abut. An upstanding arcuate flange 37d is provided at the outer periphery of each of the segments 26 and is designed to fit in the space between the depending flange 35' and the opposed outer periphery of the resilient ring. The inner periphery of each of the arcuate segmets 26 has an arcuate hub 74 depending therefrom which is designed to fit between the outer surface of the pipe 53 and the wall of opening 50. The hub 74 defines a shoulder 73 which rests on the top surface of the inner periphery of annular shoulder 55 and an additional shoulder 32c is provided adjacent the undersurface and at the outer periphery of each of the segments, said shoulder 32c resting on the bottom leg 37c of the locking ring, the latter having a depending bead 54 which will be compressed against the shoulder 55. It is to be noted that the bottom leg 37c has an inwardly projecting flange 37e which fits into a corresponding groove in the segments 26.

As the assembly of the embodiment shown in FIG. 13 is readily apparent since it is similar to the assembly of the embodiment shown in FIG. 12, it will not be described.

With the constructions above described, it is apparent that the rigid arcuate segments are not permanently bonded to the resilient ring, but are retained in the resilient ring frictionally. Thus, when the locking member is folded, the portion of the resilient ring adjacent the ends of the arcuate segments will be free to move, thereby reducing the stress which would be imparted to such resilient ring at such folding portion if the resilient ring was cemented or otherwise permanently bonded to the rigid arcuate segments.

With such an arrangement, it is apparent that the resilient ring can be made of harder material than would be needed if considerable extension thereof was required to permit the folding. As a result, a more effective support will be provided for the bladder abutting against the ring as in the case of the embodiment shown in FIGS. 1 to 12 and a wider range of materials can be used in the fabrication thereof.

With the construction of the deformable locking member shown in the embodiments of FIGS. 1 to 11, as the entire upper surface thereof contacted by the inflated bladder 15 on expansion thereof is an uninterrupted resilient surface defined by the resilient ring 35 and as no discontinuity is provided in the discharge end of the accumulator radially outwardly of the plug 18, there will be no spaces or discontinuities through which the expanded bladder 15 may protrude. Consequently, failure of the bladder due to pinching or cutting is avoided.

In disassembling a pressure vessel or accumulator of the type shown in FIGS. 1 to 11, utilizing the locking member of the type described, it is necessary first to push the plug 18 inwardly after the nut 22 has been removed so that the locking member may be slipped off the neck 19' of the plug and deformed for removal through port 13. If there is any air pressure in the bladder 15, the latter will press against such plug 18 and prevent displacement thereof. It is apparent therefore, that in disassembly of the accumulator, a mechanic cannot neglect first to release all of the air pressure remaining in the bladder and consequently there is no danger of injury as a result of the plug being blown out of the container.

As many changes could be made in the above constructions, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. A foldable locking member comprising a ring of resilient material having a recess in its inner wall surface and a plurality of rigid arcuate segments having conformations on their outer peripheries adapted to coact with the recess to releasably yet securely retain the arcuate segments in the ring with their adjacent ends in juxtaposition, the inner peripheries of said arcuate segments extending laterally inward beyond the inner periphery of said resilient ring to define an abutment shoulder.

2. The combination set forth in claim 1 in which said resilient ring has a pair of diametrically spaced fins extending inwardly from the inner periphery thereof and adapted to be positioned between the adjacent ends of the arcuate segments.

3. A foldable locking member comprising a ring of resilient material having an annular groove therein substantially L-shaped in cross section, one of the legs of the groove extending substantially parallel to the top surface of the ring and the other leg extending away from such top surface at substantially right angles thereto toward the bottom surface of the ring, the end of such last-named leg remote from the top surface defining an opening and a plurality of rigid arcuate segments associated with said ring, each of said segments having a substantially flat top surface and having a substantially L-shaped rim rising from near the outer periphery of such top surface, said L-shaped rim having one leg extending at right angles to such top surface and another leg extending parallel to such top surface, the legs of said rim being complementary to the L-shaped groove in said ring and adapted to fit snugly therein, the inner periphery of said flat surface of said arcuate segments extending inwardly of said resilient ring when the segments are positioned therein.

4. The combination set forth in claim 3 in which the outer periphery of said resilient ring is bevelled inwardly from the top surface thereof and each of the arcuate segments has a correspondingly bevelled portion on its outer periphery.

5. The combination set forth in claim 3 in which each of the arcuate segments has a depending arcuate hub on its undersurface adjacent its inner periphery.

6. A deformable locking member for connecting two parts comprising a ring of resilient material having an annular recess in the inner periphery thereof coaxial with the ring, a plurality of rigid arcuate segments adapted to be positioned in said recess with the outer periphery of said arcuate segments positioned in said recess and the inner periphery extending laterally inwardly from said ring and defining an abutment shoulder, said recess and the outer periphery of said rigid arcuate segments having completmentary conformations to securely yet releasably retain the segments in said ring, said segments having their adjacent ends in juxtaposition.

7. The combination set forth in claim 6 in which said recess comprises a plurality of spaced parallel annular grooves and the outer periphery of each arcuate segment has arcuate projections adapted to fit into said annular grooves.

8. The combination set forth in claim 6 in which said recess has a plurality of spaced parallel annular grooves and the outer periphery of each arcuate segment has outwardly extending arcuate projections adapted releasably yet securely to fit in said annular grooves, the top surface of said resilient ring resting on the top surface of the rigid arcuate segments and terminating short of the inner peripheries thereof to define said abutment shoulder, the top and bottom surfaces of said resilient ring at the periphery thereof having beads extending outwardly at right angles thereto parallel to the axis of the locking member.

9. In a pressure vessel of the type having a port, a deformable partition secured in said pressure vessel and adapted to move toward said port and a cylindrical member in said port having a laterally outward extending annular flange at its inner end of outer diameter less than that of said port and defining a shoulder, the combination therewith of a deformable locking member for said cylindrical member positioned between said shoulder and the inner surface of said pressure vessel encompassing said port, said deformable locking member comprising a ring of resilient material having a recess in the inner periphery thereof, a plurality of rigid arcuate segments having their outer peripheries positioned in said recess, said recess in said inner periphery and said rigid arcuate segments having complementary conformations to releasably yet securely retain the segments in said resilient ring, the upper surface of said resilient ring terminating short of the inner periphery of said arcuate segments to define an abutment shoulder, said segments defining a ring member of inner diameter slightly greater than the diameter of said tubular member so that the latter may fit therein with said flange shoulder seated on said abutment shoulder, said arcuate segments having arcuate notches on their undersurface adjacent their inner peripheries defining an arcuate hub of width but slightly less than the distance between the tubular member and the wall of said port, said notches defining arcuate shoulders adapted to seat on the periphery of the port, and resilient means normally urging said tubular member outwardly, whereby said flange shoulder of said tubular member will seat on the abutment shoulder of said locking segments and the shoulder defined by the recess in said locking segments will seat on the periphery of said port adjacent said opening.

10. The combination set forth in claim 9 in which the upper and lower surfaces of said resilient ring adjacent the inner periphery thereof have upstanding beads, said beads being compressed when said tubular member is moved outwardly by said resilient means.

11. The combination set forth in claim 9 in which a washer encompasses said tubular member and has its outer periphery extending beneath said second member outwardly of the periphery of the opening therein, a retaining member is secured to said tubular member and said resilient means comprises a coil spring compressed between said washer and said retaining member.

12. A deformable locking member comprising a ring of resilient material having a recess in its inner periphery, a plurality of rigid arcuate segments having their outer peripheries positioned in said recess, said recess and said outer peripheries of said rigid arcuate segments having complementary conformations to releasably retain said arcuate segments in said resilient ring, said rigid arcuate segments having their inner peripheries extending laterally inward of the inner periphery of said resilient ring and defining abutment shoulders, the root ends of said abutment shoulders having an upstanding wall, and the inner periphery of said rings having a depending rim adapted to be positioned against said upstanding wall.

13. The combination set forth in claim 12 in which each of said rigid arcuate segments has an upstanding arcuate flange at the top surface of its outer periphery, the inner surface of each of said flanges defining said upstanding wall, each of said arcuate segments having a depending arcuate flange at the inner periphery of its undersurface, said flanges defining arcuate hubs.

14. An assembly comprising a tubular member having an annular flange at one end, a second member having an opening therein of diameter greater than the diameter of said flange, said opening defining an annular shoulder, a deformable locking member interposed between said flange and said annular shoulder, said deformable locking member comprising a resilient ring having a recess in the inner periphery thereof, a plurality of rigid arcuate segments having their inner peripheries positioned in said recess, said inner peripheries and said recess having complementary conformations to releasably yet securely retain said ring and said segments together, the top wall of said ring having a depending rim at the inner periphery thereof and said rigid arcuate segments each having an upstanding arcuate flange at the outer periphery thereof, the inner surface of said depending rim being adapted to rest against the inner surface of said arcuate flanges, a portion of each of said arcuate members extending inwardly of said ring rim and defining an abutment surface against which the flange of said tubular member may abut, the undersurface of said rigid arcuate segments adjacent the inner peripheries thereof having depending flanges defining hubs adapted to be positioned between the wall of said opening and the adjacent surface of said tubular member, said hubs defining arcuate shoulders outwardly thereof adapted to rest on the periphery of said opening in said second member, the bottom surface of said resilient ring being adapted to rest against the shoulder adjacent said opening, the inner periphery of said ring adjacent its undersurface having an inwardly extending annular flange, said arcuate members having arcuate recesses adapted to receive said flange, the outer surface of the rim at the upper surface of said ring and the undersurface of said ring adjacent its inner periphery having outwardly extending beads adapted to engage the side wall of said flange and said shoulder respectively, and means to urge said tubular member outwardly from said opening.

15. The combination set forth in claim 14 in which the means to urge said tubular member outwardly comprises a coil spring, a washer encompassing said tubular member and abutting against the undersurface of said second member, a retaining member releasably secured to said tubular member, said coil spring being compressed between said retaining member and said washer.

References Cited by the Examiner

UNITED STATES PATENTS

| | | | |
|---|---|---|---|
| 2,436,612 | 2/1948 | Sheets | 277—181 |
| 2,710,630 | 6/1955 | Greer | 277—235 X |
| 2,743,950 | 5/1956 | Helfrecht et al. | 277—179 |
| 3,123,367 | 3/1964 | Brummer et al. | 277—179 |
| 3,180,650 | 4/1965 | Liebig | 277—235 |

LAVERNE D. GEIGER, *Primary Examiner.*

T. L. MOORHEAD, *Assistant Examiner.*